(12) United States Patent
Arrowood et al.

(10) Patent No.: US 9,001,976 B2
(45) Date of Patent: Apr. 7, 2015

(54) SPEAKER ADAPTATION

(75) Inventors: Jon A. Arrowood, Smyrna, GA (US);
Robert W. Morris, Decatur, GA (US);
Marsal Gavalda, Sandy Springs, GA (US)

(73) Assignee: Nexidia, Inc., Atlanta, GA (US)

( * ) Notice: Subject to any disclaimer, the term of this patent is extended or adjusted under 35 U.S.C. 154(b) by 481 days.

(21) Appl. No.: 13/463,104

(22) Filed: May 3, 2012

(65) Prior Publication Data

US 2013/0294587 A1    Nov. 7, 2013

(51) Int. Cl.
*H04M 1/64*       (2006.01)
*G10L 15/07*     (2013.01)
*G10L 15/08*     (2006.01)
*H04M 3/51*      (2006.01)

(52) U.S. Cl.
CPC ............ *G10L 15/07* (2013.01); *G10L 2015/088* (2013.01); *H04M 3/51* (2013.01); *H04M 2201/40* (2013.01); *Y10S 379/907* (2013.01)

(58) Field of Classification Search
CPC .......... H04M 3/5175; H04M 3/42221; H04M 3/493; H04M 3/51; H04M 3/5166; H04M 15/43; H04M 15/58; H04M 2215/0188; H04M 3/2227; H04M 3/36; H04M 15/00; H04M 15/41; H04M 2203/301; H04M 2203/303; H04M 2215/0164; H04M 3/2218; H04M 15/90; H04M 2201/40
USPC ........ 379/88.01–88.04, 88.18, 93.34, 406.03, 379/907; 704/1, 7, 201, 221, 222, 231, 251, 704/254–257, 258, 270; 382/228
See application file for complete search history.

(56) References Cited

U.S. PATENT DOCUMENTS

| | | | | |
|---|---|---|---|---|
| 5,509,104 A | * | 4/1996 | Lee et al. | 704/256 |
| 5,692,100 A | * | 11/1997 | Tsuboka et al. | 704/222 |
| 5,793,891 A | * | 8/1998 | Takahashi et al. | 382/228 |
| 5,822,405 A | * | 10/1998 | Astarabadi | 379/88.04 |
| 7,487,091 B2 | * | 2/2009 | Miyazaki | 704/255 |
| 7,640,161 B2 | * | 12/2009 | Morris et al. | 704/258 |
| 7,904,296 B2 | * | 3/2011 | Morris | 704/254 |
| 8,046,224 B2 | * | 10/2011 | Rajput et al. | 704/254 |

\* cited by examiner

*Primary Examiner* — Md S Elahee
(74) *Attorney, Agent, or Firm* — Occhiuti & Rohlicek LLP

(57) ABSTRACT

A method for speaker adaptation includes receiving a plurality of media files, each associated with a call center agent of a plurality of call center agents and receiving a plurality of terms. Speech processing is performed on at least some of the media files to identify putative instances of at least some of the plurality of terms. Each putative instance is associated with a hit quality that characterizes a quality of recognition of the corresponding term. One or more call center agents for performing speaker adaptation are determined, including identifying call center agents that are associated with at least one media file that includes one or more putative instances with a hit quality below a predetermined threshold. Speaker adaptation is performed for each identified call center agent based on the media files associated with the identified call center agent and the identified instances of the plurality of terms.

17 Claims, 3 Drawing Sheets

SPEAKER ADAPTATION

BACKGROUND

This invention relates to speaker adaptation in automatic speech processing systems.

Speaker adaptation is a well-studied aspect of automatic speech recognition (ASR) systems. Conventionally, the term speaker adaptation refers to the process of customizing the statistical models (e.g., acoustic, pronunciation and/or language models) used by an ASR system for an individual user of the ASR system. Conventional ASR systems which perform speaker adaptation are often referred to as speaker independent ASR systems.

There are a number of different speaker adaptation methodologies which can be utilized by conventional speaker independent ASR systems. Some example methodologies are MAP adaptation, MLLR adaptation, and speaker space models. In general such methodologies are based on either a manually transcribed audio or are run in unsupervised modes prior to transcription.

SUMMARY

In an aspect, in general, a method for speaker adaptation includes receiving a plurality of media files, each media file associated with a call center agent of a plurality of call center agents, receiving a plurality of terms, performing speech processing on at least some of the media files to identify putative instances of at least some of the plurality of terms, each putative instance of a corresponding term being associated with a hit quality that characterizes a quality of recognition of the corresponding term, determining one or more call center agents of the plurality of call center agents for performing speaker adaptation, the determining including identifying call center agents that are associated with at least one media file that includes one or more putative instances with a hit quality below a predetermined threshold, and for each of the identified call center agents, performing speaker adaptation based on the media files associated with the identified call center agent and the identified instances of the plurality of terms.

Aspects may include one or more of the following features.

Each of the plurality of media files may include an audio recording including a portion of speech spoken by the agent. Performing speech processing may include performing wordspotting. Call center agents may be associated with at least one media file that includes one or more putative instances with a hit quality below a predetermined threshold are identified automatically. Performing speaker adaptation may include performing one or more of: acoustic model adaptation, pronunciation adaptation, and threshold adaptation.

The method may include evaluating a result of the speaker adaptation including re-performing speech processing on at least some of the media files using the result of the speaker adaptation. Re-performing speech processing on at least some of the media files may include, for each media file of at least some of the media files, modifying an existing phonetic audio track associated with the media file without requiring access to the media file. Each term of the plurality of terms may be known to be commonly spoken by the agents associated with the media files.

In another aspect, in general, a system for speaker adaptation includes a first input for receiving a plurality of media files, each media file associated with a call center agent of a plurality of call center agents, a second input for receiving a plurality of terms, a speech processor for performing speech processing on at least some of the media files to identify putative instances of at least some of the plurality of terms, each putative instance of a corresponding term being associated with a hit quality that characterizes a quality of recognition of the corresponding term, an agent selection module for determining one or more call center agents of the plurality of call center agents for performing speaker adaptation, the determining including identifying call center agents that are associated with at least one media file that includes one or more putative instances with a hit quality below a predetermined threshold, and a speaker adaptation module for performing speaker adaption for each of the identified call center agents, the speaker adaptation based on the media files associated with the identified call center agent and the plurality of terms.

Aspects may include one or more of the following features.

Each of the plurality of media files may include an audio recording including a portion of speech spoken by the agent. The speech processor may be configured to perform wordspotting. The agent selection module may be configured to identify call center agents associated with at least one media file that includes one or more putative instances with a hit quality below a predetermined threshold are identified automatically. The speaker adaptation module may include one or more of: an acoustic model adaptation module, a pronunciation adaptation module, and a threshold adaptation module.

The speaker adaptation module may include a re-scoring module for evaluating a result of the speaker adaptation module including re-performing speech processing on at least some of the media files using the result of the speaker adaptation module. The re-scoring module may be further configured to re-performing speech processing on at least some of the media files including, for each media file of at least some of the media files, modifying an existing phonetic audio track associated with the media file without requiring access to the media file. Each term of the plurality of terms may be known to be commonly spoken by the agents associated with the media files.

In another aspect, in general, software stored on a computer-readable medium includes instructions for causing a data processing system to receive a plurality of media files, each media file associated with a call center agent of a plurality of call center agents, receive a plurality of terms, perform speech processing on at least some of the media files to identify putative instances of at least some of the plurality of terms, each putative instance of a corresponding term being associated with a hit quality that characterizes a quality of recognition of the corresponding term, determine one or more call center agents of the plurality of call center agents for performing speaker adaptation, the determining including identifying call center agents that are associated with at least one media file that includes one or more putative instances with a hit quality below a predetermined threshold, and for each of the identified call center agents, perform speaker adaptation based on the media files associated with the identified call center agent and the identified instances of the plurality of terms.

Embodiments may have one or more of the following advantages:

The speaker adaptation system described herein can eliminate or greatly reduce the need to generate transcripts of entire media files; thereby rendering unsupervised speaker adaptation feasible for high speed phonetic wordspotting systems.

Other features and advantages of the invention are apparent from the following description, and from the claims.

DESCRIPTION

Figure 1:
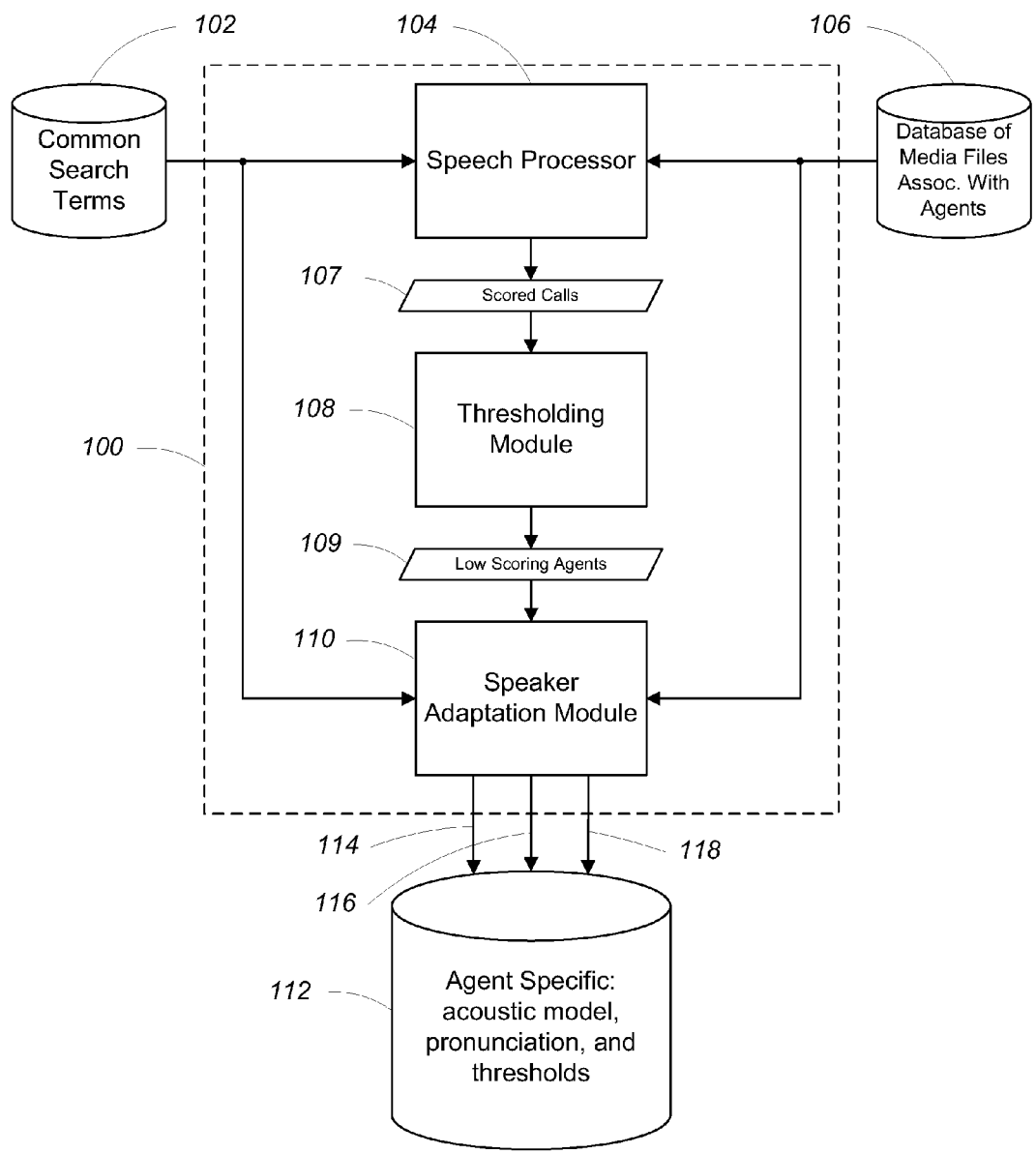
FIG. 1 is a block diagram of a speaker adaptation system.

The following description relates to speaker adaptation in high speed phonetic wordspotting systems. High speed phonetic wordspotting systems can be used, for example, to quickly identify putative instances of query terms in files which include, for example, audio or textual data. Such systems are described in U.S. Pat. No. 7,263,484 which is incorporated herein by reference.

One exemplary application of high speed phonetic wordspotting systems is quality control in customer service call centers. Thus, for the sake of simplicity, the embodiments described herein are described in the context of customer service call centers. However, the speaker adaptation concept set forth below is not limited to use in customer service call centers and is applicable to a number of other applications which are not described herein.

In a typical customer service call center, a customer service agent conducts a call with a customer regarding a customer service issue. Generally the customer service agent is required to use a predefined script when dealing with the customer to ensure that the customer is satisfied with the service provided by the agent. For quality control purposes, the conversation between the customer service agent and the customer is recorded and stored for subsequent analysis.

The recorded conversation can then be analyzed using a wordspotting system, for example, using "generic" models that are not tailored to the speaker. For example, an operator of a wordspotting system may input a query such as "My name is AND How may I help you?" to the wordspotting system in order to search for a greeting which, according to the script, should be recited by the customer service agent. The wordspotting system searches for the query terms and if any putative occurrences of the query terms are found, returns them to the operator. In some examples, this may cause the operator to flag the recording for further analysis or review. Similar queries can be used to identify terms spoken by the customer.

One common problem encountered by speech processing systems such as high speed phonetic wordspotting systems is the broad range of speech characteristics of speakers. For example, a call center may have a large number of agents including agents with strong accents, speech impediments, or other different speech characteristics. Furthermore, in some examples, variables such as the type of microphone used by an agent or the noise environment at an agent's cubicle can be problematic for speech processing systems. Thus, it is difficult to design a one-size-fits-all speech processing system which is effective across a broad range of scenarios.

As is described in the background section, automatic speech recognition (ASR) systems generally deal with this problem by applying conventional speaker adaptation methods. However, conventional speaker adaptation methods such as those described above may not be computationally feasible for high speed phonetic wordspotting systems. For example, speaker adaptation (i.e., speaker adaptation performed without human supervision) may require exhaustively transcribing a large amount of the audio recording to create a transcript. (There is a need for a less computationally intensive and time consuming speaker adaptation system and method.

1 System Overview

The speaker adaptation system and method described below streamlines the speaker adaptation process by leveraging the fact that call center conversations are structured (i.e., scripted) and often include the same phrases in many different conversations involving the same speaker.

Figure 3:
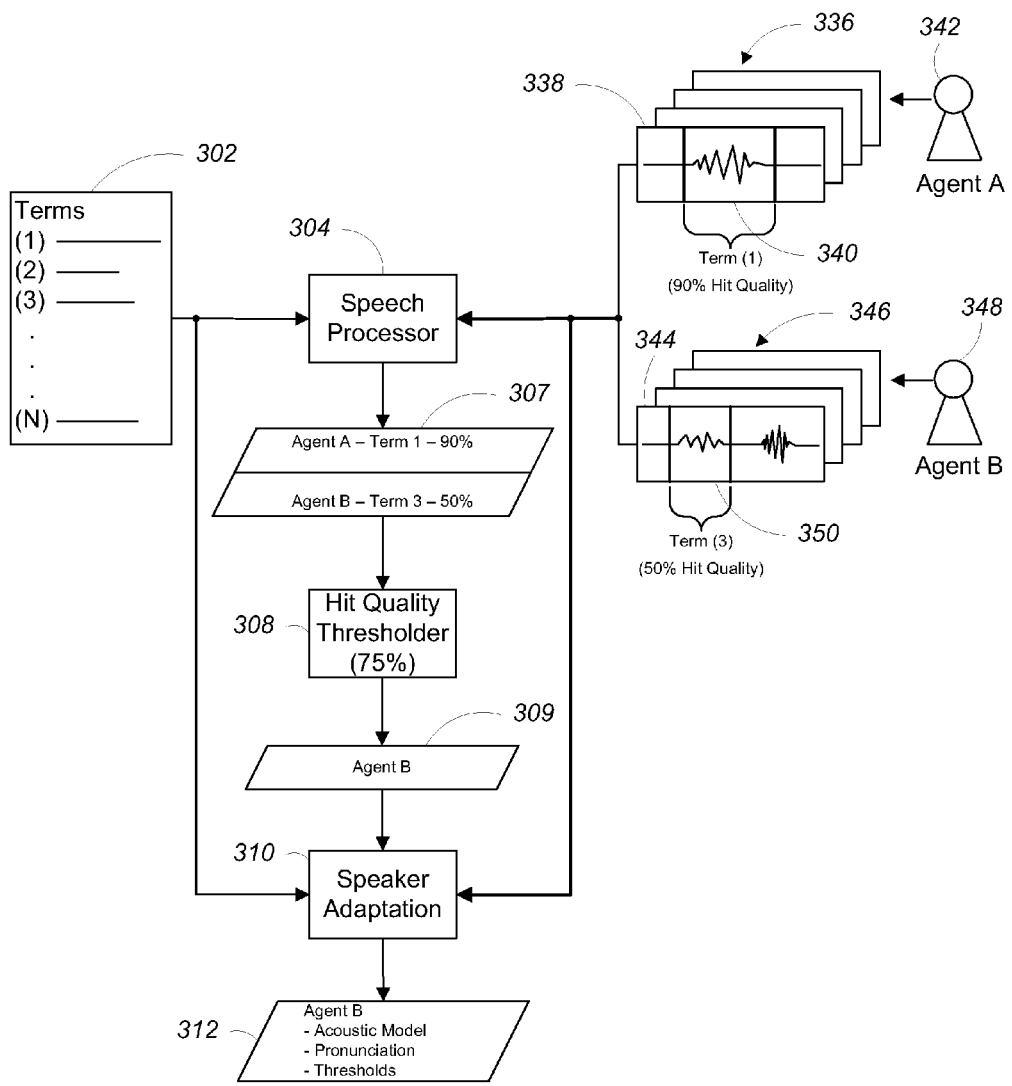
FIG. 3 is a block diagram of an exemplary operation of the speaker adaptation system.

Referring to FIG. 1, one embodiment of a speaker adaptation system 100 is configured to accept a database of common search terms 102 (e.g., derived from scripts or other domain knowledge) and a database of media files 106 where each media file in the database is associated with one of multiple call center agents (see, for example, FIG. 3, elements 342, 348). The speaker adaptation system 100 processes the common search terms 102 and the media files 106 to produce a number of agent specific acoustic models 114, agent specific pronunciation dictionary 116, and/or agent specific thresholds 118.

The database of media files 106 includes a number of media files (e.g., audio recordings, video recordings, textual transcripts, etc). Each of the media files represents a conversation between a call center agent and a customer. It is assumed that the conversation between the call center agent and the customer is at least partially structured in the sense that the call center agent follows a script during at least part of the conversation. In some examples, a single call center agent may be associated with multiple media files in the database of media files 106.

The database of common search terms 102 includes terms or phrases, of which at least some are assumed to have a reasonable possibility of being present in at least some of the media files included in the database of media files 106. In some examples, the common search terms 102 are derived from the script that the call center agents are required to follow during conversations with customers.

The agent specific acoustic model 114, pronunciation dictionary 116, and thresholds 118 are stored in a database 112 for later use by a speech processing system (e.g., a wordspotting system). Ideally, a speech processing system using the agent specific acoustic model 114, pronunciation dictionary 116, and thresholds 118 will generate more accurate speech processing results for the specific agent.

In some embodiments, the speaker adaptation system 100 includes a number of modules which collectively process the database of media files 106 and the common search terms 102. As is illustrated in the block diagram of FIG. 1, the speaker adaptation system 100 includes a speech processing module 104, a thresholding module 108, and a speaker adaptation module 110.

The speech processing module 104 receives the common search terms 102 and the media files 106 as inputs and processes the inputs to generate scored media files 107. In some examples, the speech processing module 104 receives the common search terms 102 and the media files 106 and processes at least some of the media files to identify putative instances of at least some of the common search terms. Each identified putative instance includes a hit quality score which characterizes how confident the speech processing module 104 is that the identified putative instance matches the corresponding search term. The speech processing module 104 outputs media files with the identified putative information included. In some examples, the speech processing module 104 uses a high speed phonetic wordspotting technique to search the media files for the common search terms. In some examples, each of the media files 106 is searched for each of the common search terms 102.

The scored media files 107 are passed to a thresholding module 108 that determines which, if any, call center agents are associated with putative instances that consistently include low hit quality scores. The determined call center agents are output from the thresholding module 108 as a list of low scoring agents 109.

In some examples, the list of low scoring agents is determined by first averaging the all hit quality scores for each agent 109. The average hit quality scores for each agent are then thresholded to determine which agents are included in the list of low scoring agents 109. For example, agents whose average hit quality score falls below the threshold are included in the list 109 while agents whose average hit quality are at or above the threshold are not included in the list 109.

The list of low scoring agents 109 along with the database of common search terms 102 and the database of media files 106 is then provided to a speaker adaptation module 110. The speaker adaptation module 110 performs speaker adaptation for the low scoring agents identified in the list of low scoring agents 109 and generates agent specific acoustic model 114, pronunciation dictionary 116, and thresholds 118. The speaker adaptation process is described in detail below in section 2.

The agent specific acoustic model 114, pronunciation dictionary 116, and thresholds 118 are stored in a database 112 for later use by the high speed phonetic wordspotting system.

2 Speaker Adaptation Module

Figure 2:
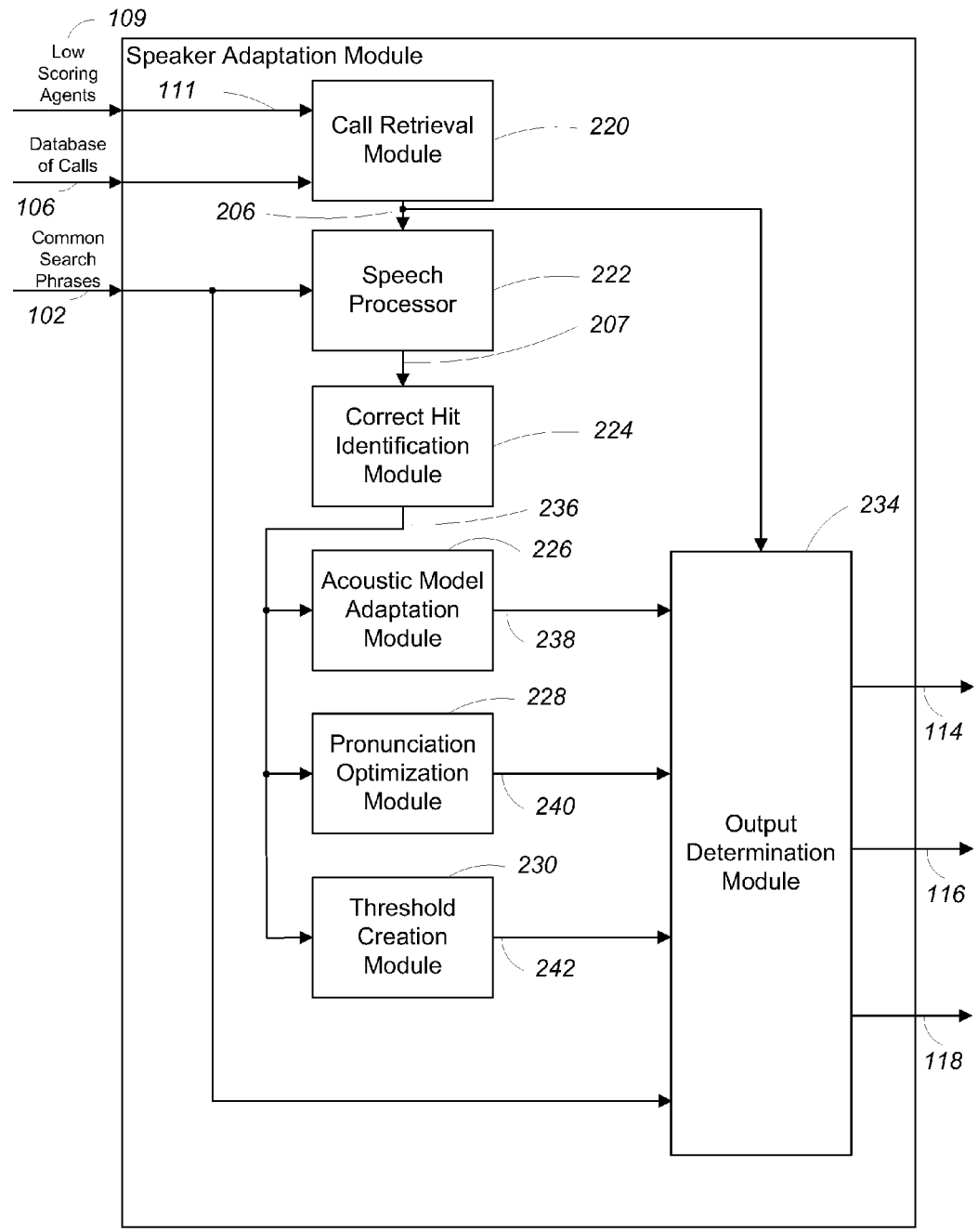
FIG. 2 is a block diagram of a speaker adaptation module included in the speaker adaptation system of FIG. 1.

Referring to FIG. 2, one embodiment of the speaker adaptation module 100 is configured to receive the list of low scoring agents 109, the database of media files 106, and the database of common search terms 102 as inputs and to process the received inputs to determine an agent specific acoustic model 114, pronunciation dictionary 116, and thresholds 118 for each agent included in the list of low scoring agents 109.

The speaker adaptation module 100 includes a call retrieval module 220, a speech processor, a correct hit identification module 224, an acoustic model adaptation module 226, a pronunciation optimization module 228, a threshold creation module 230, a re-scoring module 232, and an output determination module 234.

One at a time, each low scoring agent 111 of the list of low scoring agents 109 is passed to the call retrieval module 220 along with the database of media files 106. The call retrieval module 220 retrieves the media files 206 associated with the low scoring agent 111 from the database of media files 106. The retrieved media files 206 are provided to a speech processor 222 which also receives the common search terms 102. The speech processor 222 processes the retrieved media files 206 and the common search terms 102 to generate scored version of the retrieved media files 207. In some examples, the speech processing module 222 receives the common search terms 102 and the media files 206 and searches at least some of the media files 206 to identify putative instances of at least some of the common search terms 102. Each identified putative instance includes a hit quality score which characterizes how confident the speech processing module 222 is that the identified putative instance matches the corresponding search term. The speech processing module 222 outputs the scored media files 227 with the identified putative information included. In some examples, the speech processing module 222 uses a high speed phonetic wordspotting technique to search the media files 206 for the common search terms 102. In some examples, each of the media files 206 is searched for each of the common search terms 102.

2.1 Correct Hit Identification

The scored media files 207 are provided to a correct hit identification module 224 which determines whether the putative instances of the common search terms 102 included in the scored media files 207 are actual instances (i.e., correct hits 236) of the common search terms 102. In some examples, a user of the speaker adaption system 100 interacts with the correct hit identification module 224 to manually identify correct hits 236. For example, the correct hit identification module 224 may show the user a term associated with a putative instance of that term and concurrently play a portion of audio associated with the putative instance to the user. The user then provides input to the correct hit identification module 224 indicating whether the portion of audio matches the term.

In another example, a confidence score threshold is used to determine whether the putative instances of the common search terms 102 are correct hits 236. For example, a threshold of 80% confidence can be used to mark any putative hit with less than an 80% confidence score as incorrect hits while any putative hit with a confidence score greater than 80% is marked as a correct hit.

In another example, a threshold based on an assumption that a certain percentage of purity (i.e., a percentage of correctness) is assumed to exist in the scored media files 207 is applied to the scored media files 207. For example, if the percentage of purity is assumed to be 50%, the 50% of the putative hits included in the scored media files with the greatest confidence scores are identified as correct hits 236. The other 50% are identified as incorrect hits.

In yet another example, for each of the common search terms 102, a number of putative instances of the term can be thresholded such that only putative instances of the common term with a confidence score above a certain confidence threshold (e.g., 80% confidence) are identified as correct hits 236.

In another example, the correct hit identification module 224 can utilize contextual information surrounding a putative instance of a term to determine whether the putative instance of the term is a correct hit. For example, if the identified term is the word 'customer' and the words following the identified term are "service, how may I help you," then the putative hit is likely a correct hit since the identified word fits the surrounding context (i.e., the phrase 'customer service, how may I help you' makes sense contextually).

The correct hits 236 identified by the correct hit identification module 224 are passed to an acoustic model adaptation module 226, a pronunciation optimization module 228, and a threshold creation module 242.

2.2 Acoustic Model Adaptation

The acoustic model adaptation module 226 uses the correct hits 236 to determine a candidate agent specific acoustic model 238. In some examples, the goal of the acoustic adaptation module 226 is to determine an acoustic model which can identify the common search terms 102 for the specific agent 111 with a higher confidence than is possible with a generic acoustic model.

In some examples, the acoustic model adaptation module 226 implements a constrained training due to the limited amount of speech data available to it (i.e., the putative instances identified as correct hits by the correct hit identification module 224). In particular, a limited number of free parameters of a general acoustic model are re-trained. For example, if the acoustic model is a Gaussian mixture model, the means of the various distributions can be adapted for the specific agent while the variances of the distributions remain the same. In other examples, the various distributions of the Gaussian mixture model can be shifted (e.g., by applying a linear filter).

In other examples, the acoustic model adaptation module 226 includes a number of pre-defined acoustic models (e.g., a male English speaker, a female English speaker, a male Spanish speaker, a female Spanish speaker, and so on). The acoustic model adaptation module 226 determines which pre-defined acoustic model is the best acoustic fit for the specific agent and selects that acoustic model as the candidate agent specific acoustic model 238. In other examples, a model interpolation is performed if the agent 111 has an acoustic fit which lies somewhere in between two or more of the pre-defined acoustic models. In yet other examples, the acoustic model adaptation module 226 includes a MAP speaker adaptation system, a MLLR speaker adaption system, or some combination of the two.

2.3 Pronunciation Optimization

The correct hits 236 are passed to a pronunciation optimization module 228 which determines a candidate agent specific pronunciation dictionary 240. The pronunciation optimization module 228 accounts for pronunciation differences between agents such as different pronunciations of the word tomato (i.e., (tə-MAH-toh) and (tə-MAY-toh)). In some examples such pronunciation differences can indicate that a different dictionary of words should be used when analyzing an specific agent's speech (e.g., an agent from the southern United States may have a significantly different vocabulary from an agent from the northeastern United States).

2.4 Threshold Creation

The correct hits 236 are passed to a threshold creation module 230 which generates candidate agent specific thresholds 242. In some examples, the threshold creation module 230 maps the confidence scores for the specific user to a universal confidence score. For example, the confidence scores of the correct hits 236 are mapped to a score which normalizes out agent to agent differences. For example, a specific agent speaking the word 'customer' may always result in a maximum confidence score of 80%. A threshold can be created such that an 80% confidence score for a term spoken by the specific agent is mapped to a normalized 100% confidence score for that term. In other examples, a similar threshold normalization procedure can be performed on a phoneme by phoneme basis.

2.5 Output Determination

The retrieved media files 206, along with the candidate agent specific acoustic model 238, pronunciation dictionary 240, and thresholds 242 are provided to an output determination module 234 which generates the final agent specific acoustic model 114, pronunciation dictionary 116, and thresholds 118. In some examples, the output determination module 234 re-scores the retrieved media files 206 using the candidate agent specific acoustic model 238, pronunciation dictionary 240, and thresholds 242 to determine whether the speaker adaptation process has improved the scores of the retrieved media files for the agent 111. If so, the candidate agent specific acoustic model 238, pronunciation dictionary 240, and thresholds are output as the final agent specific acoustic model 114, pronunciation dictionary 116, and thresholds 118. Otherwise user intervention is required.

3 Example

Referring to FIG. 3, an example of the operation of the speaker adaptation system 100 of FIG. 1 is illustrated. In the Example, two call center agents, Agent A 342 and Agent B 348, are each associated with a plurality of media files 336, 346. In this example, the first plurality of media files 336 includes a plurality of audio recordings of customer service calls conducted by Agent A 342. The second plurality of media files 346 includes a plurality of audio recordings of customer service calls conducted by Agent B 348.

A set of N commonly used terms 302 is passed to a speech processor (e.g., a wordspotter) 304 along with the first and second pluralities of media files 336, 346. The speech processor 304 identifies Term (1) 340 of the set of N commonly used terms 302 in a first media file 338 of the first plurality of media files 336 with a 90% hit quality (i.e., confidence score). The speech processor 304 also identifies Term (3) 350 of the set of N commonly used terms 302 in a second media file 344 of the second plurality of media files 346 with a 50% hit quality (i.e., confidence score).

The identified terms 307 including their confidence scores and agent associations are passed to a hit quality thresholder 308 with a threshold of 75%. The hit quality thresholder 308 identifies Agent B 348 as the only low scoring agent 309 since Term (3) has a hit quality score of 50% which is less than the 75% threshold and is associated with Agent B 348.

The identified low scoring agent 309 (i.e., Agent B 348), the set of N commonly used search terms 302, and the first and second plurality of media files 336, 346 are passed as inputs to the speaker adaptation module 310 which uses the inputs to generate an Agent B specific acoustic model, pronunciation dictionary, and thresholds 312.

4 Alternatives

As will be apparent to one of skill in the art, various methods can be used to obtain a transcript of a media file (e.g., automatic speech recognition or manual transcription) and to identify candidate phrases (e.g., using confidence score, phase relevancy measures, etc.) within the transcript.

In some examples, full transcription of a media file is attempted and only the portions of the transcript which are deemed reliable are used for adaptation.

5 Implementations

Systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

It is to be understood that the foregoing description is intended to illustrate and not to limit the scope of the invention, which is defined by the scope of the appended claims. Other embodiments are within the scope of the following claims.

What is claimed is:

1. A method for speaker adaptation, the method comprising:
   receiving a plurality of media files, each media file including audio content and associated with a call center agent of a plurality of call center agents;
   receiving a plurality of terms that are likely to be spoken in the audio content of the media files;
   performing speech processing on the audio content of at least some of the media files to identify putative instances of at least some of the plurality of terms, each putative instance of a corresponding term being associated with a hit quality that characterizes a quality of recognition of the corresponding term;
   determining one or more call center agents of the plurality of call center agents for performing speaker adaptation, the determining including identifying call center agents that are associated with at least one media file of the plurality of media files that includes one or more putative instances with a hit quality below a predetermined threshold; and
   for each of the identified call center agents, performing speaker adaptation based on the at least one media file associated with the identified call center agent and the identified instances of the plurality of terms.

2. The method of claim 1 wherein each of the plurality of media files includes an audio recording including a portion of speech spoken by the agent.

3. The method of claim 1 wherein performing speech processing includes performing wordspotting.

4. The method of claim 1 wherein call center agents associated with at least one media file that includes one or more putative instances with a hit quality below a predetermined threshold are identified automatically.

5. The method of claim 1 wherein performing speaker adaptation includes performing one or more of: acoustic model adaptation, pronunciation adaptation, and threshold adaptation.

6. The method of claim 1 further comprising evaluating a result of the speaker adaptation including re-performing speech processing on at least some of the media files using the result of the speaker adaptation.

7. The method of claim 6 wherein re-performing speech processing on at least some of the media files includes, for each media file of at least some of the media files, modifying an existing phonetic audio track associated with the media file without requiring access to the media file.

8. The method of claim 1 wherein each term of the plurality of terms is known to be commonly spoken by the agents associated with the media files.

9. A system for speaker adaptation comprising:
   a first input for receiving a plurality of media files, each media file including audio content and associated with a call center agent of a plurality of call center agents;
   a second input for receiving a plurality of terms that are likely to be spoken in the audio content of the media files;
   a speech processor for performing speech processing on the audio content of at least some of the media files to identify putative instances of at least some of the plurality of terms, each putative instance of a corresponding term being associated with a hit quality that characterizes a quality of recognition of the corresponding term;
   an agent selection module for determining one or more call center agents of the plurality of call center agents for performing speaker adaptation, the determining including identifying call center agents that are associated with at least one media file of the plurality of media files that includes one or more putative instances with a hit quality below a predetermined threshold; and
   a speaker adaptation module for performing speaker adaptation for each of the identified call center agents, the speaker adaptation based on the at least one media file associated with the identified call center agent and the plurality of terms.

10. The system of claim 9 wherein each of the plurality of media files includes an audio recording including a portion of speech spoken by the agent.

11. The system of claim 9 wherein the speech processor is configured to perform wordspotting.

12. The system of claim 9 wherein the agent selection module is configured to identify call center agents associated with at least one media file that includes one or more putative instances with a hit quality below a predetermined threshold are identified automatically.

13. The system of claim 9 wherein the speaker adaptation module includes one or more of: an acoustic model adaptation module, a pronunciation adaptation module, and a threshold adaptation module.

14. The system of claim 9 wherein the speaker adaptation module includes a re-scoring module for evaluating a result of the speaker adaptation module including re-performing speech processing on at least some of the media files using the result of the speaker adaptation module.

15. The method of claim 14 wherein the re-scoring module is further configured to re-performing speech processing on at least some of the media files including, for each media file of at least some of the media files, modifying an existing phonetic audio track associated with the media file without requiring access to the media file.

16. The system of claim 9 wherein each term of the plurality of terms is known to be commonly spoken by the agents associated with the media files.

17. Software stored on a non-transitory computer-readable medium comprising instructions for causing a data processing system to:
   receive a plurality of media files, each media file including audio content and associated with a call center agent of a plurality of call center agents;
   receive a plurality of terms that are likely to be spoken in the audio content of the media files;
   perform speech processing on the audio content of at least some of the media files to identify putative instances of at least some of the plurality of terms, each putative instance of a corresponding term being associated with a hit quality that characterizes a quality of recognition of the corresponding term;
   determine one or more call center agents of the plurality of call center agents for performing speaker adaptation, the determining including identifying call center agents that are associated with at least one media file of the plurality of media files that includes one or more putative instances with a hit quality below a predetermined threshold; and for each of the identified call center agents, perform speaker adaptation based on the at least one media file associated with the identified call center agent and the identified instances of the plurality of terms.

\* \* \* \* \*